United States Patent [19]
Whyte

[11] 3,942,168
[45] Mar. 2, 1976

[54] DISTRIBUTION NETWORK POWER LINE COMMUNICATION SYSTEM

[75] Inventor: Ian A. Whyte, Pittsburgh, Pa.

[73] Assignee: Westinghouse Electric Corporation, Pittsburgh, Pa.

[22] Filed: Jan. 31, 1975

[21] Appl. No.: 546,070

[52] U.S. Cl. .......................... 340/310 R; 340/152 R
[51] Int. Cl.² ....................................... H04M 11/04
[58] Field of Search ......... 340/310 R, 310 A, 152 R

[56] References Cited
UNITED STATES PATENTS

| | | | |
|---|---|---|---|
| 3,693,155 | 9/1972 | Crafton | 340/310 R |
| 3,733,586 | 5/1973 | Lusk | 340/310 R |

*Primary Examiner*—Thomas B. Habecker
*Attorney, Agent, or Firm*—D. R. Lackey

[57] ABSTRACT

A distribution network power line communication system including a central communication terminal at a distribution substation in signal communication with a plurality of remote communication terminals via the electrical distribution power lines. The central communication terminal uniquely addresses a selected remote communication terminal with an interrogation signal which requests the performance of a selected distribution automation function. The selected remote communication terminal performs the requested function and sends a response signal back to the central communication terminal. Signal amplifying repeaters are disposed in signal communication with the electrical distribution power lines, which ensure that the interrogation and response signals are at usable signal levels when they reach their intended destinations. The signal amplifying repeaters include delay devices which provide a signal delay time interval selected such that a repeater will not apply a signal to the electrical distribution power lines at the same time a signal is to be received by the repeater. In one embodiment, the message elements or bits of a signal word are spaced such that each bit of the word is delayed and transmitted by a repeater before the repeater receives the next bit of the word; and, in another embodiment the complete signal word is received by a repeater before the transmitter portion of the repeater is operated.

7 Claims, 10 Drawing Figures

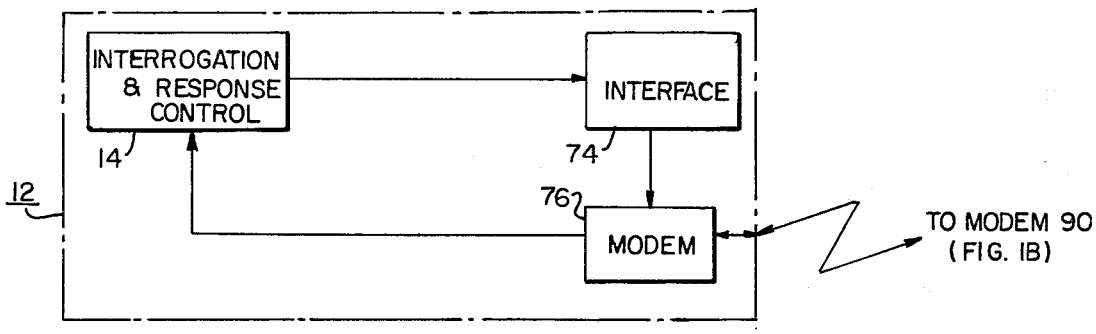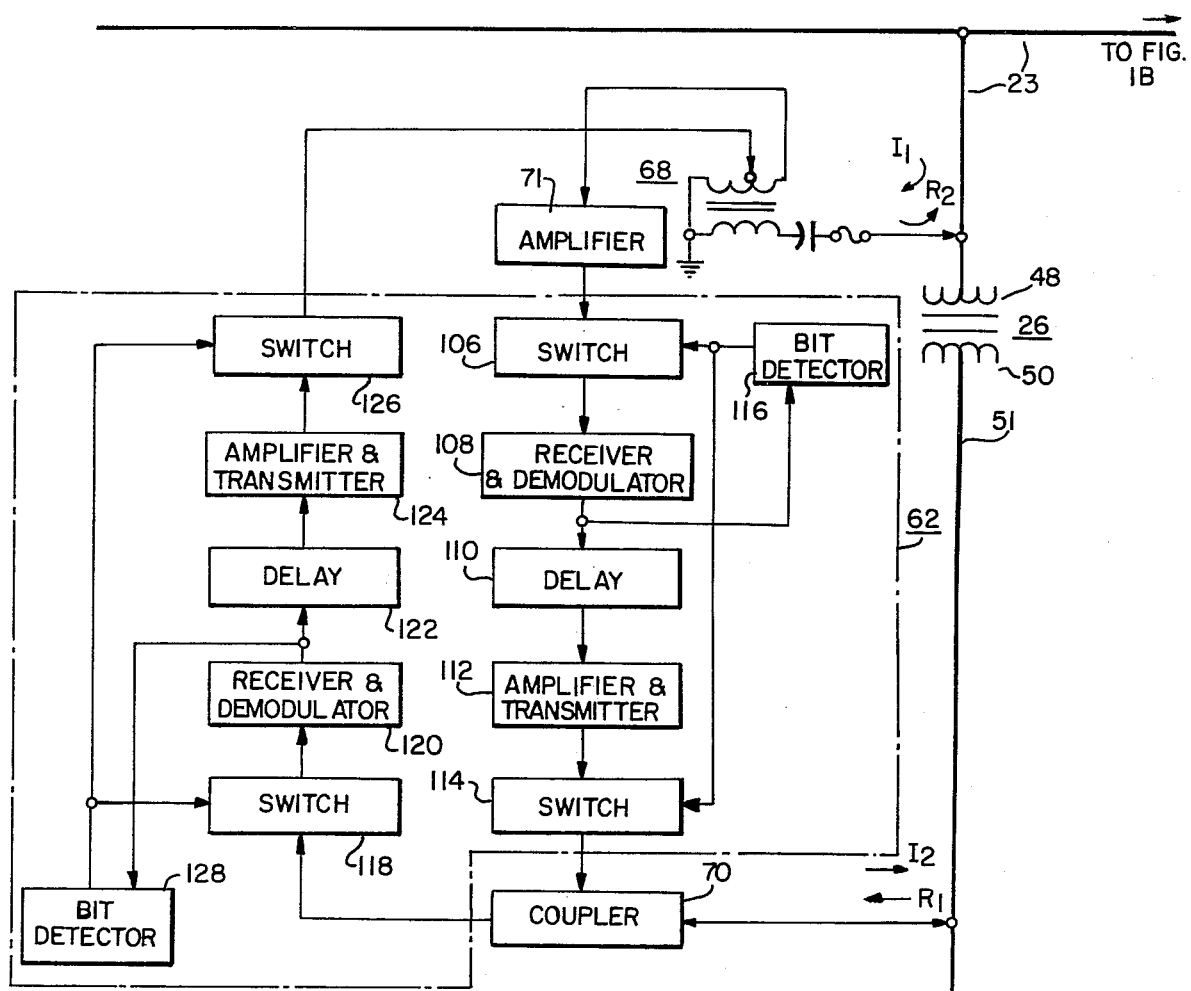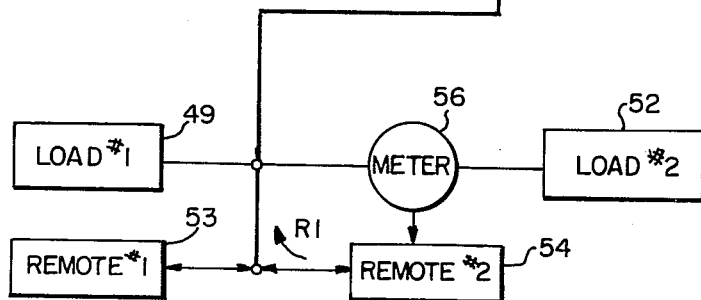
FIG. 1A

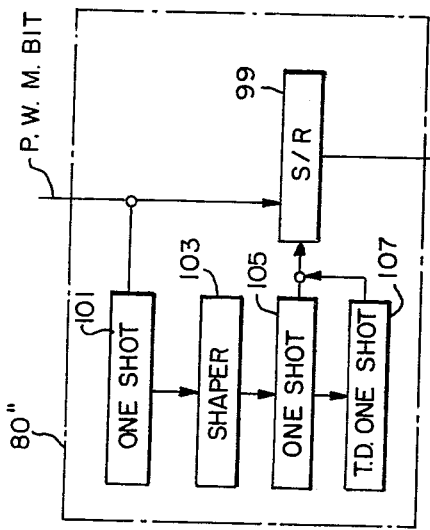
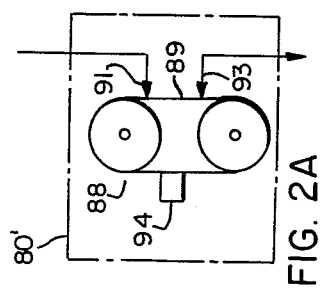
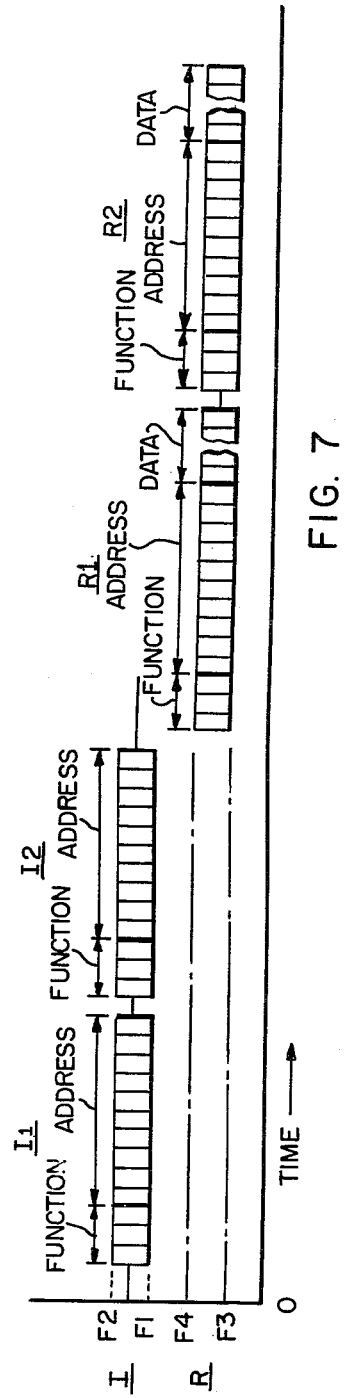

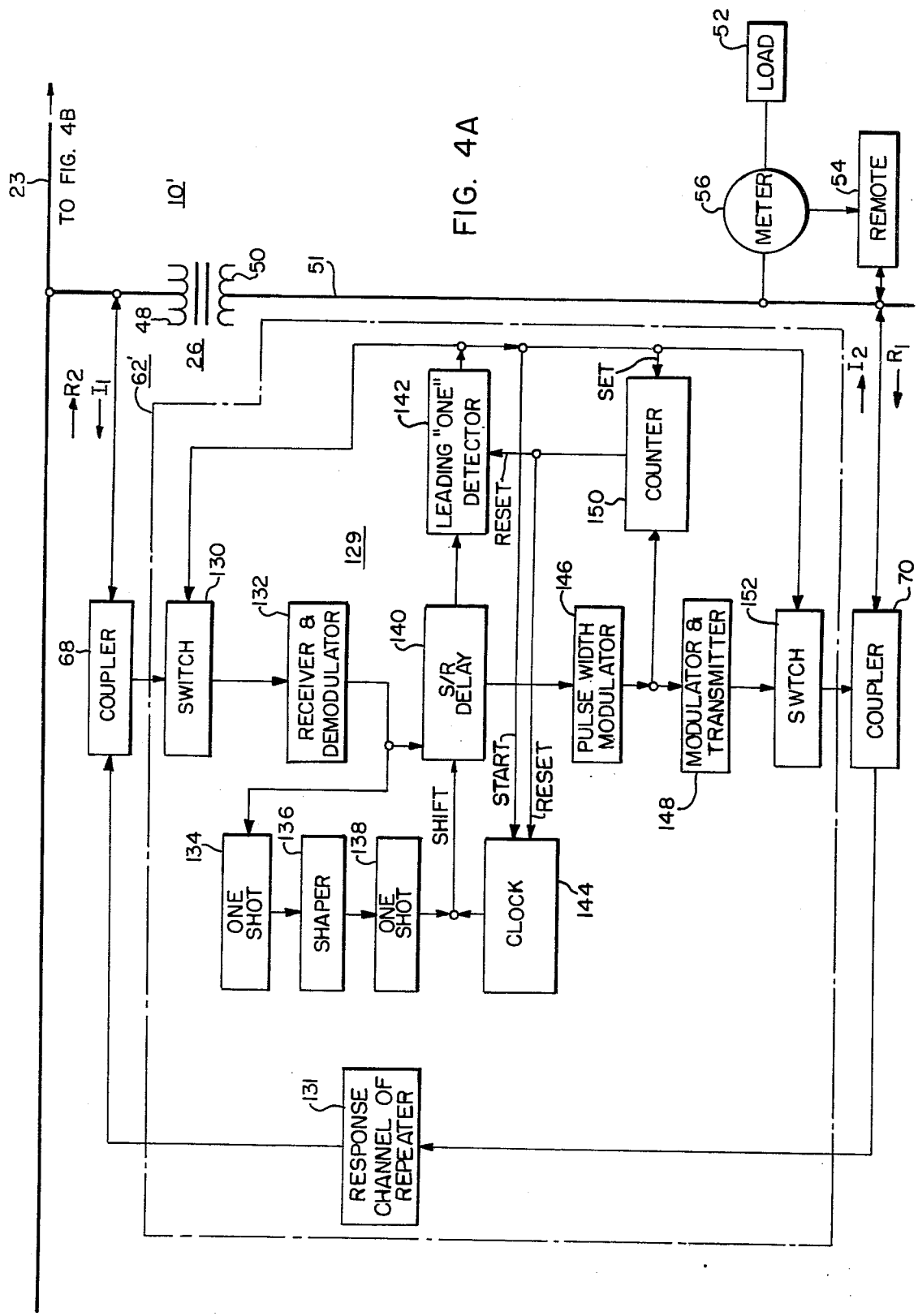

DISTRIBUTION NETWORK POWER LINE COMMUNICATION SYSTEM

CROSS REFERENCE TO RELATED APPLICATIONS

Certain of the apparatus disclosed but not claimed in the present application may be claimed in one or more of the following co-pending patent applications, which are assigned to the same assignee as the present application:

1. Application Ser. No. 546,069, filed Jan. 31, 1975, in the names of I. A. Whyte, L. G. Ottobre, and J. T. McGivern.
2. Application Ser. No. 546,068, filed Jan. 31, 1975, in the name of I. A. Whyte.
3. Application Ser. No. 425,759, filed Dec. 18, 1973, in the name of I. A. Whyte and now abandoned.

BACKGROUND OF THE INVENTION

1. Field of the Invention

The invention relates in general to power line carrier communication systems, and more specifically to distribution network power line carrier systems for performing distribution automation functions.

2. Description of the Prior Art

Power line carrier communication has been used for many years over high voltage transmission lines between the power generating site and power transmission switching site or distribution substation sites, for supervisory control purposes. Less common is communication over the power line conductors of a distribution network, from the distribution substation through the distribution transformers to the electrical load. Communicating over the distribution network power lines is more difficult than over the high voltage transmission lines, as the distribution lines, along with the large number of distribution transformers, present relatively poor signal transmission characteristics, and they introduce electrical noise and signal interference.

The recent increase in the desirability of performing certain distribution automation functions, such as automatic reading of utility meters, selective load control, performing load continuity checks, and the like, has made it attractive to use the distribution power line conductors for communications, but the problems connected therewith will have to be economically dealt with in order to provide a practical system.

U.S. Pat. Nos. 3,656,112; 3,702,460 and 3,815,119 and co-pending application Ser. No. 425,759, filed Dec. 18, 1973, all disclose some form of communication via the distribution network of an electrical utility. U.S. Pat. No. 3,656,112 discloses a communications system which uses a combination of an electric power line and a wireless link. The wireless link is used to bypass distribution transformers and other obstructions located in the transmission path. U.S. Pat. No. 3,702,460 discloses making the neutral conductor of the distribution power line available as a communication link by inserting a parallel resonant circuit between the neutral and ground, at each ground point in the system. The neutralground communication circuit bypasses distribution transformers. U.S. Pat. No. 3,815,119 uses the power line conductors on the secondary side of a distribution transformer to transfer meter readings associated with the secondary circuits to a common receiver point, where the readings are stored until they can be read, such as by a mobile unit which periodically travels near the receiver site and interrogates the site by a wireless link. The co-pending application Ser. No. 425,759, which is assigned to the same assignee as the present application, provides communication zones by using repeaters as frequency translators, isolating various sections of the distribution power line system by using different frequency bands.

SUMMARY OF THE INVENTION

Briefly, the present invention is a new and improved distribution network power line communication system for performing distribution automation functions, such as automatically reading utility meters, making service continuity checks, and selectively controlling electrical loads. The electrical distribution network includes a substation, primary power line conductors from the substation to a plurality of distribution transformers, and secondary power line conductors from the distribution transformer to a plurality of electrical loads.

Interrogation and response communication links are provided which extend between a communication terminal located at the substation and remote communication terminals located at the electrical loads. These communication links utilize the primary and secondary power line conductors of the electrical distribution system.

The communication terminal at the substation receives an interrogation signal from a central control location by conventional means, such as via a telephone line, and using this signal as a modulating wave, sends the interrogation signal to the remote communication terminals over the primary and secondary power line conductors. The interrogation signal includes an address of a selected remote communication terminal, and if more than one automation function may be selected, the interrogation signal also includes a function identifier.

A remote communication terminal which is uniquely addressed by an interrogation signal decodes the function identifier, it performs the requested function, and it provides a response signal on its associated secondary power line conductors, which response signal includes an identification portion, such as the address of the responding remote communication terminal, and if the requested function was to read a utility meter, the signal also includes data representing the reading.

The communication terminal at the substation, upon receiving a response signal sends the response signal to the central control location by conventional means, such as via a telephone link.

Signal amplifying repeaters are disposed in signal communication with the electrical power line conductors where necessary to boost the signal strength of the interrogation and/or response signals. They may be associated only with the primary line conductors, to boost the signal strength of a signal on a long run of a primary conductor, and/or they may be associated with both the primary and secondary power line conductors of a distribution network at a distribution transformer. In the latter application the repeater, in addition to amplifying a signal, provides a bypass circuit for interrogation and/or response signals around the associated distribution transformer. Distribution transformers present a significant attenuation to communication frequencies, especially in the direction from their primary to their secondary windings.

To prevent a repeater from re-amplifying a signal it has just amplified, and thus allow the repeater gain to be selected without regard to unwanted feedback and oscillation, the repeater includes means for delaying a received signal, with the delay time interval selected such that the amplified signal is not applied to the power line at the same time the repeater is to receive a signal. Thus, when the repeater output is applying a signal to the power line, the repeater input may be effectively disconnected from the power line, preventing the output signal of a repeater from becoming an input signal thereto.

In one embodiment of the invention, the input signal has a mark-space format, with the time interval of a space being at least as long as the time interval of a mark. The repeater transmits each bit of the input signal during a space, before receiving the next signal element or bit, with the receiving portion of the repeater being effectively disconnected or rendered inoperative during the time the transmitting portion of the repeater is operative.

In another embodiment of the invention, the repeater stores the complete signal word before its transmitting portion is operated, and the signal words are spaced such that the receiving portion of the repeater may be rendered inoperative while the complete signal word is being transmitted by the repeater.

Each repeater may include a single channel, for handling a selected one way communication, or two channels for handling both interrogation and response signals. The interrogation and response signals may be transmitted in non-overlapping frequency bands, permitting simultaneous operation of the two channels, or, if the interrogation and response signals are in the same frequency band, the operation of the two channels may be coordinated such that they are not operative at the same times.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIGS. 1A and 1B is a block diagram of a distribution power line carrier communication system constructed according to an embodiment of the invention;

FIGS. 2A and 2B illustrate delay devices and arrangements which may be used in the repeaters shown in FIG. 1;

FIGS. 4A and 4B is a block diagram of a distribution power line carrier communication system constructed according to another embodiment of the invention;

FIG. 7 is a graph which illustrates the format of the various interrogation and response signals used in the power line communication systems shown in FIGS. 1 and 4.

DESCRIPTION OF PREFERRED EMBODIMENTS

Figure 1B:
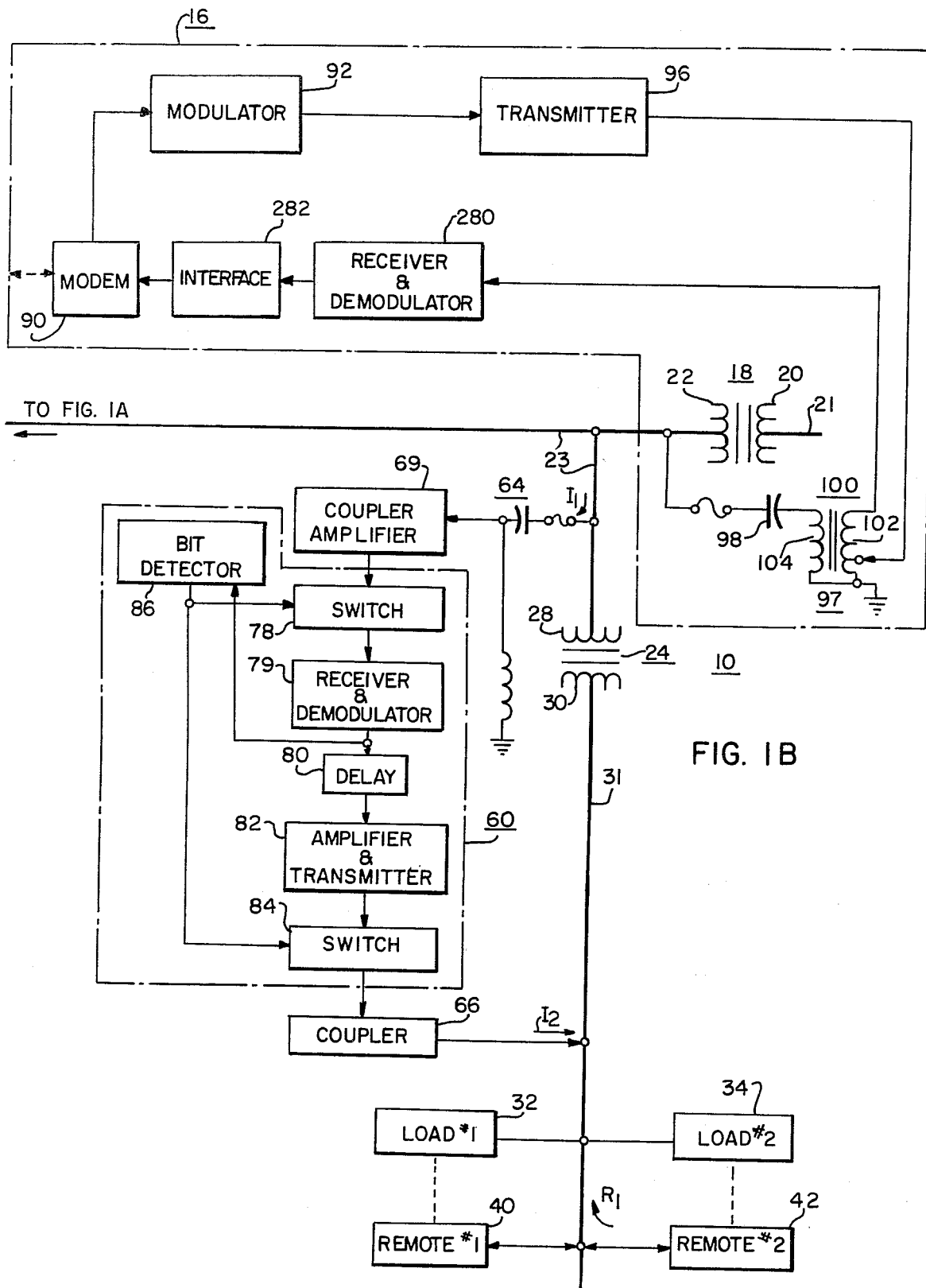

Referring now to the drawings, and FIG. 1 in particular, there is shown a block diagram of a new and improved distribution power line carrier communication system 10 constructed according to a first embodiment of the invention. Certain of the remaining figures will also be referred to when describing FIG. 1. For example, FIG. 3 which illustrates signal formats and waveforms useful in the understanding of FIG. 1 will be referred to when appropriate.

The distribution power line carrier communication system 10 includes a source 12 of interrogation signals. Source 12 includes interrogation and response control 14, such as a digital computer located at the main control location, such as the central business office of an electrical utility. The computer may be programmed, for example, to interrogate remote communication terminals associated with loads connected to the distribution power lines of the electrical utility, to obtain data relative to the readings of utility meters, such as electrical, gas and water meters, and/or it may request the performance of other functions such as controlling loads. Electrical loads, such as electrically operated hot water heaters, may be selectively turned off and enabled, in order to provide a more constant overall demand for electrical power. Load continuity checks and service disconnect functions may also be provided.

The interrogation signals which are prepared by control 14 are sent by any conventional means such as via a telephone system, to a selected distribution substation. Each of the substations to be communicated with include a communication terminal for receiving interrogation signals from, and for sending response signals to, the source 12 of interrogation signals located at the central or main location. For purposes of example, FIG. 1 illustrates a single central communication terminal/distribution substation combined 16, as each such combination would be of like construction.

A convenient medium for communicating between the source 12 at the main control location and the plurality of distribution substations is by a telephone system. The address of each distribution substation would be a telephone number, with the interrogation and reponse control 14 gaining access to a selected substation by automatically dialing its number. A telephone link is an economical and convenient method of communicating between source 12 and the plurality of substations, and for purposes of example, it will be assumed that this portion of the interrogation and response communication link is a telephone system. However, it is to be understood that this specific link may be wireless, such as radio or microwave, or any other suitable form of communication.

Each distribution substation includes one or more step-down power transformers, such as transformer 18, which includes primary windings 20 connected to the high voltage transmission line 21, and secondary windings 22 connected to the primary distribution network. The primary distribution network will be referred to as the first distribution power line conductors 23.

The primary distribution network voltage level is stepped down to the secondary voltage distribution level near the connected loads by a plurality of distribution transformers, such as distribution transformers 24 and 26. Distribution transformer 24 includes primary windings 28 connected to the first power line conductors 23, and secondary windings 30 connected to a secondary distribution network 31 which will be referred to as the second distribution power line conductors. A plurality of remote locations, broadly termed electrical loads, such as residential customers, are connected to the second power line conductors 31, with two remote locations or electrical loads 32 and 34, being illustrated. Each electrical load 32 and 34 represents all of the individual electrical loads associated with the remote location. Each remote location or electrical load 32 and 34 has an addressable remote communication terminal associated therewith, with electrical loads 32 and 34 having addressable communication terminals 40 and 42, respectively. The remote communication terminals are each connected to the second distribution power line conductors 31.

In like manner, distribution transformer 26 includes primary windings 48 connected to the first power line conductors 23, and secondary windings 50 connected to a secondary distribution network 51, which will be referred to as the second distribution power line conductors. Electrical loads, such as loads 49 and 52, are connected to the power line conductors 51. Electrical loads 49 and 52 have addressable remote communication terminals 53 and 54, respectively, associated therewith, which are connected to the second power line conductors 51, such as for reading a meter 56 associated with the load 52, and/or for performing other distribution automation functions at load 52.

Signal amplifying repeaters 60 and 62 are provided for amplifying certain of the communication signals. Signal amplifying repeaters may be disposed in signal communication with only the first power line conductors 23 for amplifying communication signals on long runs between the distribution substation 16 and certain distribution transformers, and/or they may be disposed in signal communication with both the first power line conductors 23 and selected second power line conductors, such as second power line conductors 31 or second power line conductors 51, in order to bypass a distribution transformer. For purposes of example, repeaters 60 and 62 are illustrated as bypassing distribution transformers 24 and 26, respectively, with repeater 60 being in signal communication with the first and second power line conductors 23 and 31, respectively, and with repeater 62 being in signal communication with first and second power line conductors 23 and 51, respectively. Repeater 60 is illustrated as being a single channel repeater for receiving interrogation signals from the first power line conductors 23 and applying them to the second power line conductors 31, and repeater 62 is illustrated as being a dual channel repeater, with one channel receiving interrogation signals from the first power line conductors 23 and applying them to the second power line conductors 51, and the other channel receiving response signals from the second power line conductors 51 and applying them to the first power line conductors 23.

When observing the complete communication system 10 from an interrogation and response signal viewpoint, the interrogation communication link includes the source 12 of interrogation signals the communication link between the source 12 and the central communication terminal 16, such as a telephone link, the central communication terminal 16, the first power line conductors 23, a plurality of signal coupler-repeater-signal coupler combinations, such as the combination which includes signal coupler 64, repeater 60 and signal coupler 66, and the combination which includes signal coupler 68, repeater 62, and signal coupler 70, second power line conductors, such as power line conductors 31 and 51, and a plurality of addressable remote communication terminals associated with each second power line conductor network.

A response communication link extends from each addressable remote communication terminal associated with distribution transformer 24, such as remote communication terminal 40, the second power line conductors 31, through the associated distribution transformer 24 from the secondary windings 30 to the primary windings 28 thereof, over the first power line conductors 23 to the central communication terminal 16 located at the substation, and then through the telephone link to the interrogation and response control 14 located at the central control location. A response communication link also extends from each addressable remote communication terminal associated with distribution transformer 26, such as remote terminal 54, the second power line conductors 51, via coupler 70, repeater 62 and coupler 68 to the first power line conductors 23, to the central communication terminal 16, and then through the telephone link to the control 14.

When a distribution transformer is relatively close to the substation 16, the communication arrangement relative to transformer 24 may be successfully utilized, with the repeater 60 bypassing the distribution transformer 24 in the interrogation link, but not in the response link. This arrangement is made possible by the fact that the signal attenuation presented by a distribution transformer is usually less in the direction from the secondary windings to the primary windings, then is in the opposite direction, and the receiver at the substation 16 may be made more sensitive than the receivers at the remote terminals without suffering the economic penalty which would be associated with constructing the receivers at the remote terminals with this sensitivity. In the communication system of the present invention, it is advantageous to have less sensitive receivers at the remote terminals, for reasons other than initial cost, as it eliminates the need to discriminate between an original interrogation signal and the subsequently repeated, higher strength interrogation signal provided by a repeater.

When a distribution transformer is located relative to the substation such that its response signal from its associated remote communication terminals will be unreliably weak by the time the signals reach the substation 16, the communication arrangement shown relative to 26 may be used, which arrangement amplifies both the interrogation and response signals, as well as bypassing the distribution transformer in both the interrogation and response links.

The present invention includes two embodiments, with FIG. 1 illustrating a first embodiment which includes repeaters which operate bit-by-bit, receiving a bit, and sending the bit after a time delay, before receiving the next bit of the signal word. A second embodiment, wherein a repeater receives a complete signal word before repeating any part of it will be hereinafter described relative to FIG. 4.

Figure 3:
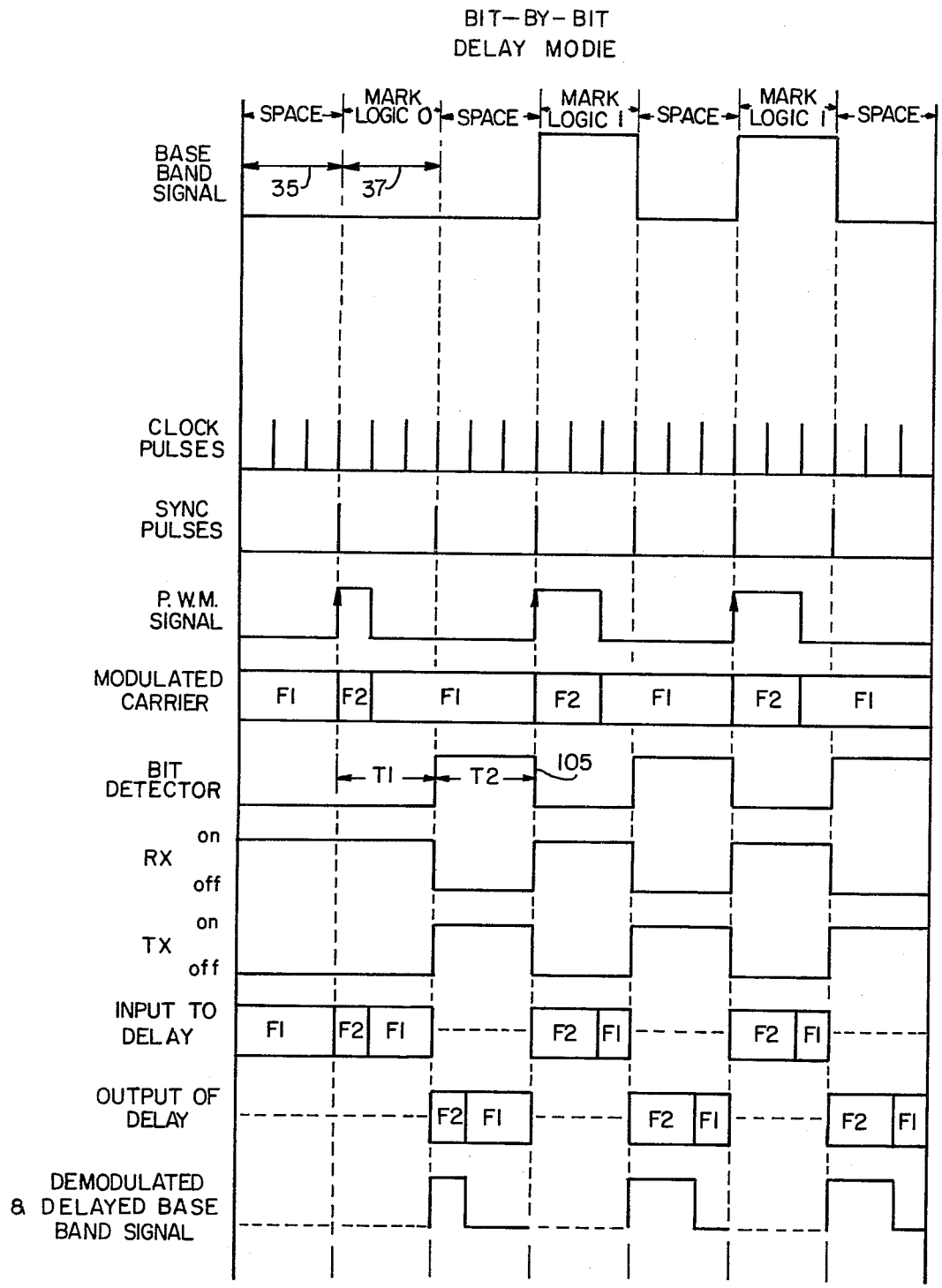
FIG. 3 is a graph which illustrates waveforms of signals useful in explaining the operation of the power line carrier communication system shown in FIG. 1.

Returning now to the source 12 of interrogation signals shown in FIG. 1, the interrogation and response control 14 prepares the interrogation signal with a markspace format. This signal is indicated in the graph of FIG. 3 adjacent the legend "Base Band Signal". In order to conserve space in the drawings, the base band signal is indicated in FIG. 3 with only three bits of intelligence, but it is to be understood that the interrogation signal word may have any number of bits, such as a leading synchronizing bit which is always at the logic one level, to identify the start of an interrogation word, a plurality of bits which identify a specific function to be performed, a plurality of bits which set forth the unique address of a selected remote communication terminal, and a parity bit. As illustrated in FIG. 3, the base band signal includes a space between each mark having a time interval, indicated by reference 35, which is at least as long as the time interval of the mark of intelligence containing interval, which is indicated by reference 37. The three bits of the interrogation signal shown in FIG. 3 are indicated as being logic zero, logic one and logic one.

The interrogation and response control 14 converts the bits of the base band signal to a form such that the start of a bit is readily identifiable. This means may include a pulse width modulator which also provides the base band binary signal with a self-clocking format as illustrated in FIG. 3 adjacent the legend "P.W.M. Signal". In the pulse width modulated format shown in FIG. 3 for purposes of example, each mark or bit cell of intelligence is divided into three equal parts. The three-part bit cell always starts with a positive going transition which remains at the logic one level for the first one-third of the bit; the middle portion of the bit cell is at the logic level which corresponds to the logic level of the original base band bit; and, the last one-third of the bit cell is at the logic zero level. FIG. 7 illustrates a suitable format for a serial interrogation word $I_1$, which is prepared by control 14. The spaces between the bits are not illustrated in FIG. 7. It will be noted that signal $I_1$ includes a 10 bit remote communication terminal address and a 3 bit function identifier, but any suitable number of bits may be used depending upon the number of remote terminals, and the number of functions, respectively.

FIG. 3 also indicates clock pulses and sync pulses, adjacent these legends, which are generated by the control 14 in the process of converting the base band signal to a pulse width modulated signal. The resulting serialized pulse width modulated signal has a format which makes it unnecessary to provide synchronizing and clocking pulses from the computer for the receiver of the signal. This signal is applied to a data set interface 74, such as Texas Instrument's SN 75150, and then to a modem 76.

Modem 76 establishes a telephone link with a modem 90 which is part of the central communication terminal located at the selected distribution substation. The serial pulse width modulated signal shown in FIG. 3 is used as the modulating wave for a modulator 92. A modulated radio frequency signal, which appears in FIG. 3 adjacent the legend "Modulated Carrier", is at a frequency F2, such as 102 KHz, when the pulse width modulated signal is at the logic one level, and at a frequency F1, such as 100 KHz when the pulse width modulated signal is at the logic zero level. While the modulator 92 preferably includes the form of modulation known as frequency shift keying (FSK), which is the form of modulation illustrated in FIG. 3, any suitable modulation may be used such as phase or frequency modulation.

The output of modulator 92 is amplified in a transmitter 96 and coupled to one of the first power line conductors 23 of the primary distribution network via a bidirectional coupler 97 which includes a 60 Hz blocking capacitor 98 and a matching transformer 100. The signal is usually coupled between one of the line conductors and the common neutral return or ground wire. The matching transformer 100 includes a primary winding 102 and a secondary winding 104. The signal from transmitter 96 is applied between a predetermined tap on the primary winding 102 and ground. The capacitor 98 and the secondary winding 104 are serially connected from one of the first power line conductors 23 to ground.

The modulated carrier is picked up by a suitable signal coupler associated with each repeater, such as signal couplers 64 and 68. The signal couplers 64 and 68 may be of the direct contact type, as illustrated, or if the coupler is only used to pick up a signal from the power line, it may be of the magnetic field type. A suitable unidirectional coupler of the magnetic field type is disclosed in co-pending application Ser. No. 546,068, filed Jan. 31, 1975, which is assigned to the same assignee as the present application.

Each of the signal couplers 64 and 68, in addition to the blocking capacitor and matching transformer, include an amplifier, such as amplifiers 69 and 71, respectively. The amplified interrogation signal provided by each of the signal couplers is applied to the interrogation channel of its repeater, such as repeaters 60 and 62.

Repeater 60 includes only an interrogation channel, which channel includes switch means 78, receiver and demodulator 79, delay means 80, amplifier means 82, and switch means 84, all serially connected in the recited order between the output of coupler amplifier 69 and the input of a signal coupler 66. Coupler 66 applies the interrogation signal to the second power line conductors 31. Repeater 60 also includes a bit detector 86.

Switch means 78 is normally closed, while switch means 84 is normally open. Thus, an incoming bit is received by the receiver and demodulator 79, which reconstitutes the bit into a pulse width modulated signal, as illustrated in FIG. 3. The bit detector 86 is responsive to the output of the receiver and demodulator 79. When the positive going transition of a bit takes place, indicating the start of a bit, the bit detector starts to time a time interval T1, as illustrated in FIG. 3 adjacent the legend "bit detector", with the time interval T1 being equal to the duration of a mark in the base band signal. At the end of the time interval T1, the bit detector provides a pulse 105 having a time duration T2 equal to the duration of a space in the base band signal. Thus, the bit detector 86 may be a one-shot or monostable multivibrator which provides a time delayed pulse triggered by the positive going waveform of a pulse width modulated bit. Bit detector 86 has no affect on the switches 78 and 84 for the duration of the initiating bit, allowing the receiver and demodulator 79 to output the complete bit to the delay means 80.

When the time interval T1 expires and pulse 105 is generated, pulse 105 opens switch 78 and closes switch 84. Switches 78 and 84 may be any suitable switch capable of operating at the data rate involved, such as a transistor, or thyristor.

The output of the receiver and demodulator 79 is applied to a delay device 80, which delays the bit output by the receiver and demodulator 79. The delay time interval is selected such that the delayed bit will appear in one of the spaces of the base band signal, such as the space which follows the original position of the bit in the base band signal. Delay means 80 may be any suitable delay device. A simple delay device which effectively demonstrates the principle is a magnetic recorder, such as the recorder 88, referenced generally with the reference 80' in FIG. 2A. Recorder 88 may include a driven magnetic belt 89, with the output of the receiver and demodulator 79 being applied to the belt with a record head 91, and with a pick-up 93 spaced from the record head 91 to receive the recorded signal from the magnetic belt a predetermined time delay later. The pick-up 93 is connected to the amplifier 82. An erase head 94 erases the recorded signal before the recorded portion of the belt again reaches the record head 91. This type of delay preserves the pulse width modulated format of the base band signal.

FIG. 2B illustrates a delay arrangement 80'' which uses the pulse width modulated format of the bit to clock the logic one or logic zero into a shift register 99, which bit is clocked out after a selected time delay. The shift register 99 may be a one-bit shift register, if desired. A first one shot 101 is triggered by the positive going edge of a pulse width modulated bit, which waveform is shown in FIG. 5 adjacent the legend "1st One Shot". The graph of FIG. 5 is specifically for the embodiment of the invention shown in FIG. 4, and thus does not include a space between each bit, but the graph of FIG. 5 is useful in describing the operation of the circuit shown in FIG. 2B. A shaper 103 squares the one shot signal, which signal has a duration which terminates at the midpoint of the bit. The negative going termination of the signal from the first one shot 101 triggers a second one shot 105 which provides a pulse which shifts the logic signal appearing at the midpoint of the bit into the shift register 99. The shift pulse provided by the one shot 105 is illustrated in FIG. 5 adjacent the legend "2nd One Shot". The output of the one shot 105 is also applied to a third one shot 107, which operates after a predetermined time delay to provide a shift pulse for the shift register 99 which shifts the stored pulse to the output of the shift register. The predetermined time delay of the one shot 107 may be equal to one-half of a bit duration, to shift the stored bit to the output of the shift register 99 at the start of the next space. The shift register 99 removes the pulse width modulation and restores the original base band signal shown in FIG. 3. If pulse width modulation is required by the addressed remote communication terminal, this function may be provided as a part of amplifier 82.

The delay means 80 may operate directly on a modulated carrier, if desired, instead of demodulating the carrier signal, such as by utilizing a delay line provided by a coaxial cable selected to have a lumped capacitance and inductance required to provide the desired delay interval. The coaxial cable is usually terminated with an impedance selected to eliminate or reduce signal reflection. If the delay arrangement does not require demodulation of the signal, the bit detector would be arranged to detect the start of a bit from the modulated carrier, such as detecting the change from frequency F1 to frequency F2, or by detecting the start of frequency F2.

Figure 6:
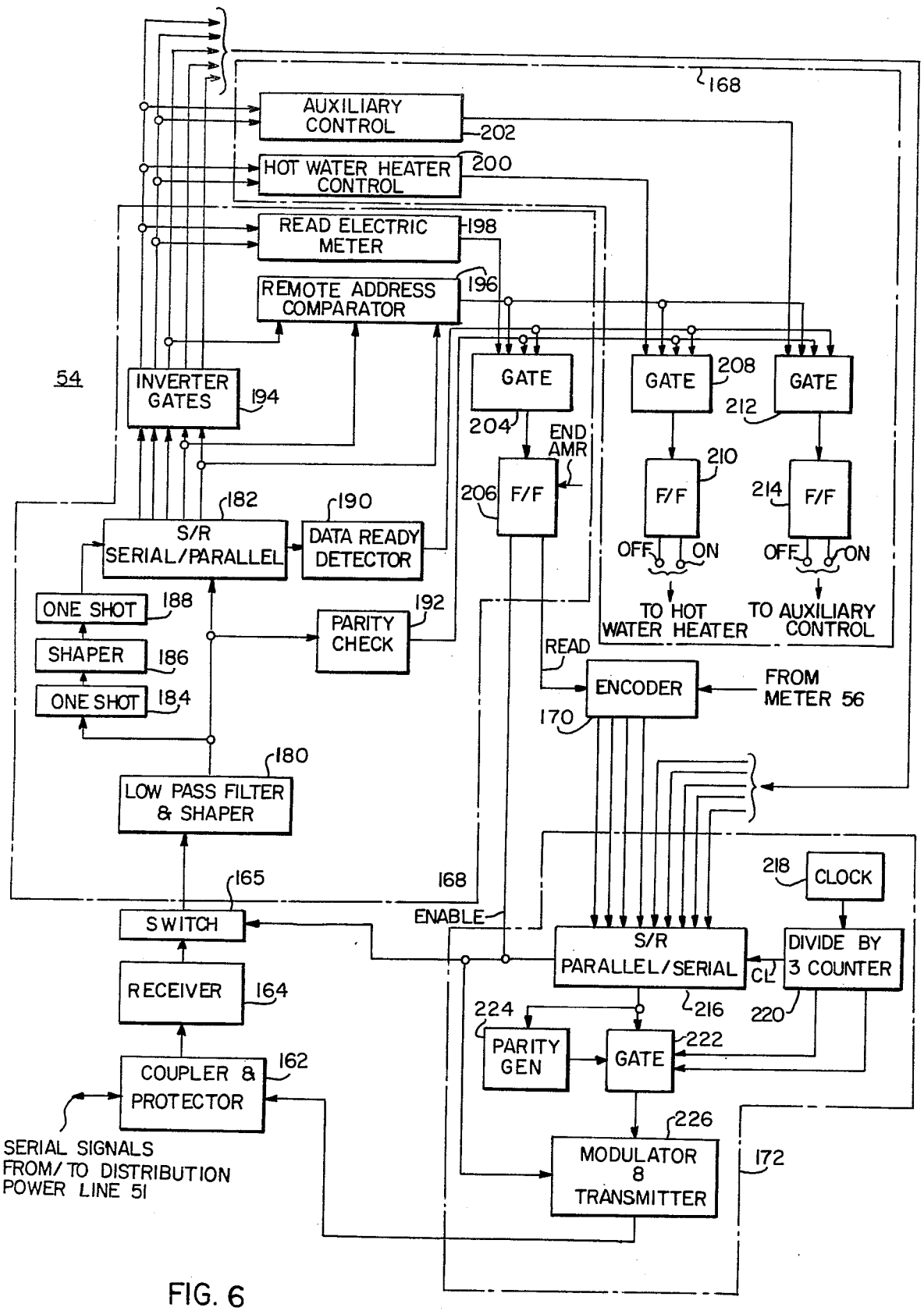
FIG. 6 is a block schematic diagram of a remote communication terminal which may be used for the remote communication terminals shown in FIGS. 1 and 4.

The delayed bit is amplified and transmitted by the amplifier and transmitter 82 through the now closed switch 84, and applied to the second power line conductors 31 via signal coupler 66. Signal coupler 66 may include a capacitor and matching transformer, similar to the signal couplers used on the first power line conductors, but its components are selected to withstand the relatively low secondary voltages involved, and thus they need not be as costly as the components of the higher voltage signal coupler. Each remote communication terminal associated with distribution transformer 24 will receive the delayed bit of the interrogation signal and store it in a shift register. When the complete interrogation word is received, the uniquely addressed remote communication terminal will decode the function identifier, perform the requested function, such as automatically reading an electric meter, and send back a response signal which includes an identification portion identifying the remote communication terminal which is responding, as well as identifying the function performed, along with the data representing the meter reading. This signal is received by a receiver and demodulator 280 at the substation 16 via signal coupler 97. The signal is then applied to an interface 282, which is similar to interface 74, and it is then sent back to the source 12 via modem 90. A suitable remote communication terminal is shown in FIG. 6, which will be described in detail relative to the second embodiment of the invention shown in FIG. 4.

Repeater 62 includes two channels, i.e., an interrogation channel and a response channel. The interrogation channel, which is tuned to the frequency band used by the interrogation signal, includes a switch 106, a receiver and demodulator 108, delay means 110, an amplifier and transmitter 112, and a switch 114, all serially connected in the recited order between amplifier 71 of signal coupler 68 and signal coupler 70. Thus, an interrogation signal on the first power line conductors 23 is picked up by the signal coupler 68, amplified and applied to the second power line conductors 51, with the application of the amplified interrogation signal to the second power line conductors 51 being delayed by a time interval controlled by delay means 110, which operates in cooperation with a bit detector 116 to ensure that the signal is transmitted during a time the receiver portion of the channel is inoperative. The operation of the interrogation channel of repeater 62 is the same as described relative to the interrogation channel of repeater 60, and therefore need not be described in detail.

The response channel of repeater 62, which is tuned to the frequency band used by the response signal, includes a switch 118, a receiver and demodulator 120, delay means 122, an amplifier and transmitter 124, and a switch 126, all serially connected in the recited order between signal coupler 70 and signal coupler 68. A response signal on the second power line conductors 51 is picked up by the signal coupler 70, amplified and applied to the first power line conductors 23, with the application of the amplified response signal to the first power line conductors 23 being delayed to ensure that the response signal is transmitted by the repeater 62 during a time that the receiving portion of the repeater channel is inoperative. The operation of the response channel is similar to that of the interrogation channel described relative to repeater 60, and therefore need not be described in detail.

FIG. 7 illustrates a suitable format for the response signal, except the mark and space format used in the first embodiment of the invention is not illustrated. The original response signal prepared by one of the remote terminals, such as remote communication terminal 54, is referenced R1, and includes an identification portion, such as the function performed and the unique remote address of the responding communication terminal, and a data portion, if the function performed includes sending data back to the central control point 12. The delayed, repeated response signal is referenced R2. Since a weak signal R1 may be received by the receiver and demodulator 280 at the substation 16, receiver 280 may include a level detector, which rejects response signals having a signal strength below a predetermined magnitude.

Figure 4B:
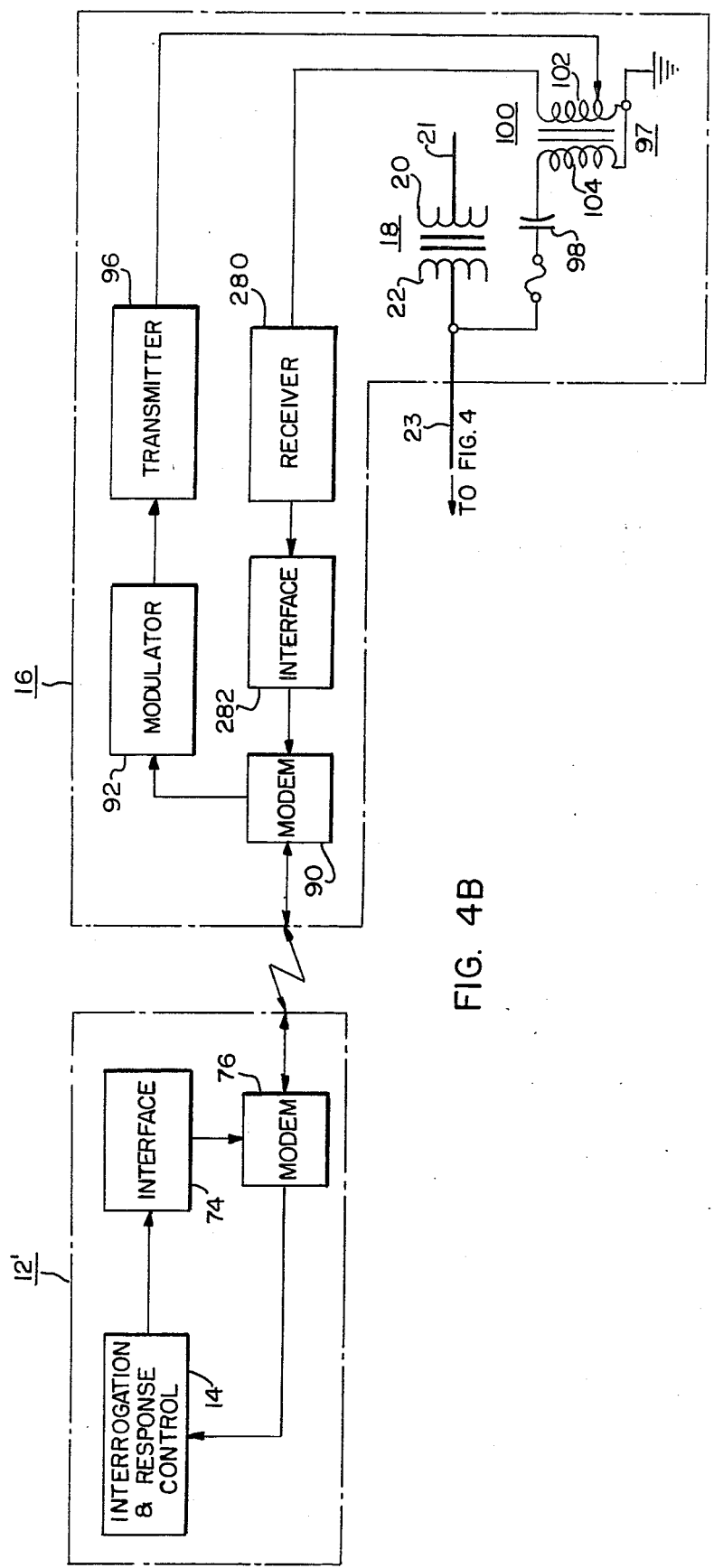
Figure 5:
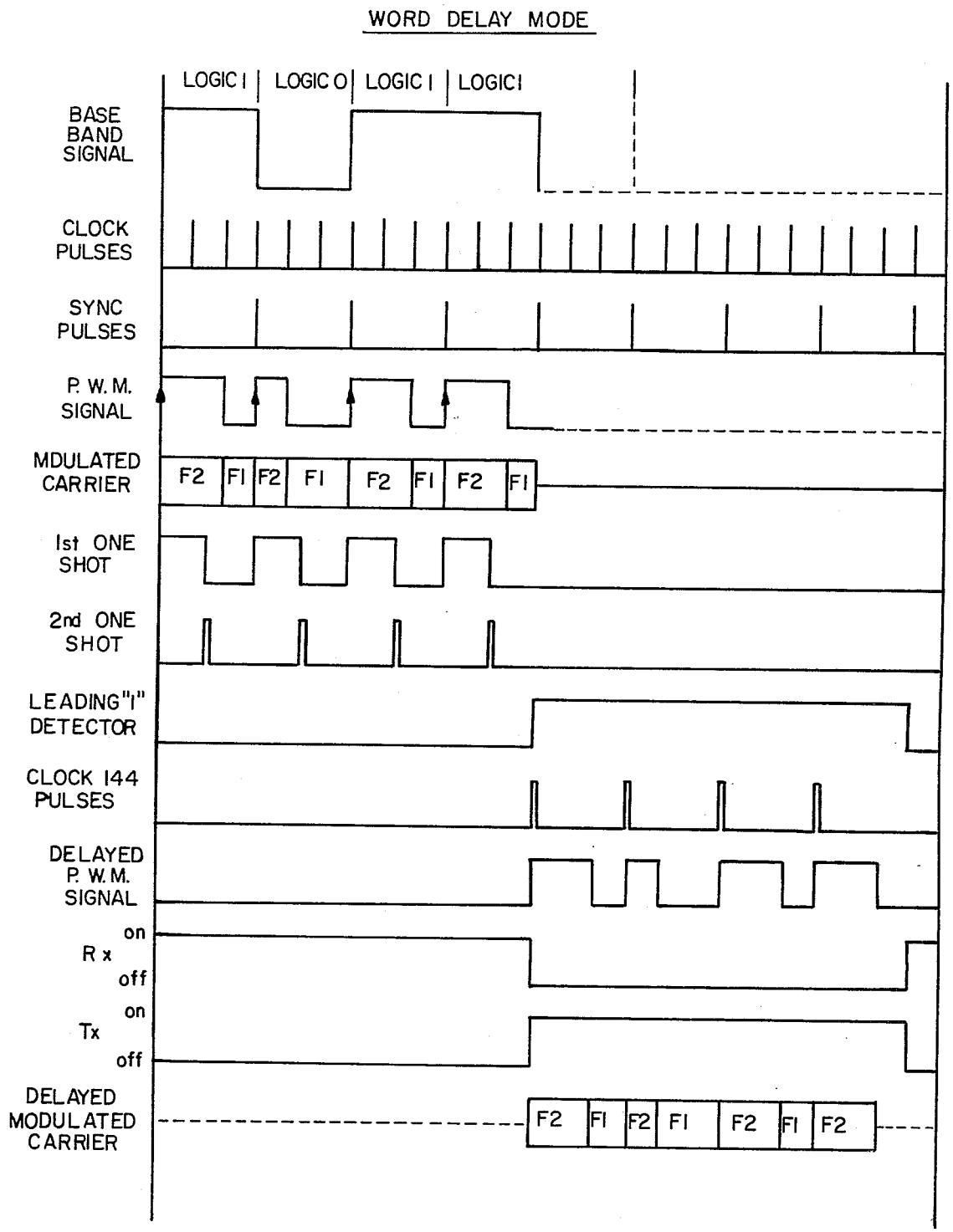
FIG. 5 is a graph which illustrates waveforms of signals useful in explaining the operation of the power line carrier communication system shown in FIG. 4.

FIG. 4 is a block diagram of a new and improved distribution power line carrier communication system 10' constructed according to a second embodiment of the invention. In the second embodiment, a complete signal word is delayed by a repeater, before it is amplified and applied to the power lines, unlike the FIG. 1 embodiment which operates on a bit-by-bit basis. Like reference numerals in FIGS. 1 and 4 indicate like components and will not be described again in detail. The source of interrogation signals 12' shown in FIG. 4 prepares interrogation signals which are similar to those described relative to FIG. 1, except the signals need not be in the mark-space format required by the FIG. 1 embodiment. FIG. 5 is a graph which illustrates waveforms useful in understanding the embodiment of the invention shown in FIG. 4, with a suitable format for the interrogation signal being illustrated in FIG. 5. A suitable base band interrogation signal, shortened to four bits for convenience, is illustrated adjacent the legend Base Band Signal. The four bits are illustrated as being at the logic one, logic zero, logic one and logic one levels, and as illustrated in FIG. 5, each bit may immediately follow the preceding bit. Clock pulses and synchronizing pulses are generated by control 14 at the source 12, with suitable waveforms therefor being shown in FIG. 5 adjacent these legends. These clock and sync pulses are used to provide a signal responsive to the base band signal in which the start of each bit is readily identifiable, such as providing a pulse width modulated as described relative to FIGS. 1 and 2B. The pulse width modulated signal is used as the modulating wave for a radio frequency carrier providing, for example, a modulated carrier using FSK to provide a signal such as shown in FIG. 5 adjacent the legend Modulated Carrier.

A repeater 62' which may have a single channel, or two channels, as desired, receives an interrogation signal $I_1$ from the first power line conductors 23, which signal was prepared by source 12. FIG. 7 illustrates a suitable format for the interrogation signal $I_1$. For purposes of example, repeater 62' is illustrated as having an interrogation channel 129 and a response channel 131. Since the interrogation and response channels are similar, only the interrogation channel 129 will be described in detail.

The interrogation channel 129 includes a normally closed switch 130 which receives an interrogation signal $I_1$ from the first power line conductors 23 via signal coupler 68. The interrogation signal $I_1$ is applied by switch 130 to a receiver and demodulator 132. The demodulated interrogation signal returns the signal to the pulse width modulated format illustrated in FIG. 5 adjacent the legend "P.W.M. Signal". The bits of the interrogation signal $I_1$ are clocked from the receiver and demodulator 132 into a delay device 140, such as a shift register, by a one shot 134, a shaper 136 and a one shot 138, which use the pulse width modulated format of the demodulated interrogation signal to clock the logic level appearing at the midpoint of a pulse width modulated bit into the shift register 140, as hereinbefore described relative to FIGS. 1 and 2B. The waveforms of the first and second one shots 134 and 138 are illustrated in FIG. 5.

The first bit of an interrogation word is always at the logic one level, and when this logic one bit is clocked to the last stage of shift register 140, this leading one is detected by means 142. Means 142, for example, may be a flip-flop which is set by the leading one. Upon detecting the leading one, the detector 142 changes its output, such as illustrated in FIG. 5 adjacent the legend "Leading 1 Detector". The output of detector 142 is connected to switch 130, to a clock 144, to a counter 150, and to a switch 152. When the detector 142 changes its output state after detecting the leading one, which may occur as soon as the leading one is detected, as illustrated in FIG. 5, or after a selected delay period, the change in the output level starts clock 144, which provides spaced pulses for serially clocking the information stored in shift register 140 to a pulse width modulator circuit 146. The clock may be preset to provide only the required number of pulses, or as illustrated in FIG. 4, the counter 150 may be used to count the bits clocked out of the shift register 140 and to provide a reset pulse when a predetermined number of bits have been counted. As illustrated in FIG. 5 adjacent the legend "Clock 144 Pulses", the clock pulses are spaced to provide the desired serial data rate, which will usually be the same rate as the data rate of the interrogation signal received from source 12.

The output of the pulse width modulator 146 is connected to a modulator and transmitter 148, and the output of transmitter 148 is connected to signal coupler 70 via a normally open switch 152.

In the operation of the interrogation channel 129 of repeater 62', the normally closed switch 130 applies an interrogation signal $I_1$ received from the first power line conductors 23 via the signal coupler 68 to the receiver and demodulator 132. The pulse width modulated format of the demodulated interrogation signal serially clocks the bits of the serial interrogation signal word into shift register 140. When the leading bit of the interrogation signal word, which is always a logic one, reaches a stage of the shift register 140 which indicates the interrogation signal word has been clocked into shift register 140, the detector 142 changes its output state. This change in the output state renders switch 130 non-conductive, it changes switch 152 from its normally open state to a closed or conductive state, it starts clock 144, and it sets counter 150 such that it will count to a predetermined number and then provide a reset pulse.

The output of clock 144 is connected to the shift input of shift register 140, and the interrogation word is serially clocked out to a pulse width modulator 146 which converts the binary or logic bits to a self-clocking format, as shown in FIG. 5 adjacent the legend P.W.M. Signal. The positive going transitions of the pulse width modulated signal are counted by counter 150, and a predetermined time interval after the count reaches a selected number, which number is selected to ensure that the interrogation signal word is completely clocked from shift register 140, the counter 150 provides a reset pulse to the clock 144, to stop the clock, and to the detector 142, to reset detector 142 and return its output state to that which existed prior to the detection of the leading one bit.

Before counter 150 provides the reset pulse, the output of the pulse width modulator 146 is used as a modulating wave for a modulator and transmitter 148, which may be of the FSK type, and the output of transmitter 148 is applied to the second power line conductors 51 via the now closed switch 152 and signal coupler 70. The transmitted interrogation signal, which is referred to as signal $I_2$ in FIG. 7 to indicate that it is delayed, compared with the original interrogation signal $I_1$, cannot become an input to receiver 132 by feedback through the distribution transformer, since switch 130 renders the receiving portion of the interrogation channel ineffective while the transmitter 148 is applying the stored interrogation signal to the second power line conductors 51.

The remote communication terminal 54 for receiving and responding to response signals addressed thereto may be of any suitable construction, with FIG. 6 illustrating, for purposes of example, a remote communication terminal which may be used.

Remote communication terminal 54 includes a bidirectional coupler and protector 162 connected to the second power line conductors 51. A suitable coupler for remote communication terminals is disclosed in co-pending application Ser. No. 444,587 filed Feb. 21, 1974, which is assigned to the same assignee as the present application. The interrogation signal picked up by coupler 162 is applied to a receiver 164, which may be similar to receiver 132 of the repeater 62'. Receiver 164 demodulates the signal and applies it through a normally closed switch 165 to a serial to parallel converter and decoder circuit 166. If the interrogation signal received is addressed to this remote communication terminal, the function identifier is decoded and the requested function is performed. Optional functions, such as controlling the on and off time of an electrical load, are illustrated generally at 168. If the requested function is to read a meter, such as an electric, gas or water meter, an encoder 170 is enabled which applies the meter reading data, such as provided by meter 56, to a parallel to serial converter, pulse width modulator, FSK modulator, and an amplifying transmitter, all shown generally at 172. The serialized response signal from the transmitter portion of the function, shown generally at 172, is applied to the coupler and detector 162, which in turn places the response signal on one of the second power line conductors 51.

More specifically, the delayed interrogation signal $I_2$ is demodulated in receiver 164. Receiver 164 may have a level detector to reject a weak interrogation signal $I_1$ which may pass through the distribution transformer, or, preferably, it is constructed with a sensitivity which will inherently reject such weak signals, which thus enables the remote receivers to be inexpensively constructed. The delayed interrogation signal is directed to a low pass filter and shaper circuit 180 and then to a serial to parallel shift register 182. The shift register 182 is clocked by the self-clocking format of the demodulated interrogation signal $I_2$, by utilizing a one shot circuit 184, a shaper circuit 186 and a one shot circuit 188, as hereinbefore described relative to the clocking of shift register 99 shown in the delay means 80'' (FIG. 2B). When the sync bit (a leading one) is clocked to the last stage of shift register 182, a data ready detector 190 provides a true output, and if the parity checks, a parity check circuit 192 provides a true output.

The parallel output of shift register 182 is applied to inverter gates 194, and the proper combination of outputs of the shift register 182 and the inverter gates 194, which correspond to the remote terminal address portion of the interrogation signal $I_2$, are applied to remote address comparator 196. If remote communication terminal 54 is uniquely addressed by signal $I_2$, comparator 196 provides a true output.

A plurality of comparators corresponding to the number of automatic functions which may be performed are provided for decoding the function identifier portion of the interrogation signal $I_2$. For purposes of example, it will be assumed that a comparator 198 identifies an automatic meter reading function, a comparator 200 identifies a load control function, such as control of an electric hot water heater, and a comparator 202 identifies an auxiliary control function, such as control of an electric air conditioner. A gate 204 and flip-flop 206 are associated with the automatic meter reading function, a gate 208 and flip-flop 210 are associated with the hot water heater control function, and a gate 212 and flip-flop 214 are associated with the auxiliary function.

The outputs of the data ready detector 190, the parity check circuit 192 and the remote address comparator 196 are all applied to gates 204, 208 and 212. The outputs of function comparators 198, 200, 202 are applied to gates 204, 208 and 212, respectively.

If the input signals to gate 204 are all true, flip-flop 206 will be set, providing a read signal for encoder 170 and "enable" signals for the transmitter function illustrated generally at 172. The encoder 170 may be of the type described in U.S. Pat. No. 3,820,073 entitled "Solid State Remote Meter Reading System Having Non-Volatile Data Accumulation" which is assigned to the same assignee as the present application; or, any other suitable encoder may be used.

The encoder 170, when enabled by a read signal from flip-flop 206 applies its count to a parallel to serial shift register 216. The unique address of the remote communication terminal along with the function identifier are also applied to the shift register 216.

The parallel input data to shift register 216 is clocked out, and a self clocking pulse width modulated format is provided by a 180 Hz clock 218, a divide-by-three counter 220 and gates 222. A parity calculator 224 provides a parity bit when necessary, and a transmitter 226 provides a modulated carrier signal. The modulated carrier is the response signal R1, the format of which is illustrated in FIG. 7. Transmitter 226 preferably provides the response signal R1 in a frequency band which is non-over-lapping with the frequency band of the interrogation signals $I_1$ and $I_2$. The setting of flip-flop 206 may initiate a timer which provides an "end AMR" signal to reset the flip-flop 206 after a period of time sufficient to carry out the meter reading function.

If the function identifier requested a load control function, the inputs to gate 208 would all be true and flip-flop 210 would be set to the state opposite to its previous state, to turn off the water heater, or to enable it to turn on in response to its temperature control.

If the function identifier requested the auxiliary function, the inputs to gate 212 would all be true and flip-flop 214 would be set to the state opposite to its previous state, to provide the desired control signals for the auxiliary function.

The setting of flip-flop 210 or flip-flop 214 may initiate a response signal which is similar to response signal R1, except it would not include meter reading data. This response signal would indicate that the function requested has been performed.

Referring again to FIG. 4, the response signal R1 applied to the second distribution power line conductors 51 is picked up by the bidirectional coupler 70 and applied to the response channel 131 of repeater 62'. This response signal R1 is delayed and then sent back to the central communication terminal as R2, bypassing the distribution transformer 26, through the first power line conductors 23.

The delayed response signal R2 is picked up from the power line conductors 23 by the bidirectional coupler 97 and applied to a receiver and demodulator circuit 280. The receiver 280 demodulates the response signal and applies it to a data set interface 282, which is similar to the data set interface 74. Modem 90 sends the signal to the central control station over the telephone link, where it is received by modem 76 and applied to the interrogation and response control 14. This completes the interrogation and response cycle initiated by the interrogation signal I₁ prepared by control 14.

I claim as my invention:

1. A distribution network power line carrier communication system including electrical power lines extending from a distribution substation to a plurality of electrical loads, comprising:
   first terminal means at the distribution substation in signal communication with the electrical power lines,
   said first terminal means applying an interrogation signal to the electrical power lines,
   and repeater means remote from the distribution substation in signal communication with the electrical power lines,
   said repeater means repeating said interrogation signal,
   said repeater means including means for receiving the interrogation signal from the electrical power lines, delay means for delaying the interrogation signal for a predetermined time interval, means applying the delayed interrogation signal to the electrical power lines, and means preventing the repeater means from repeating said delayed interrogation signal.

2. The distribution network power line carrier communication system of claim 1 wherein the repeater means includes means amplifying the interrogation signal.

3. The distribution network power line carrier communication system of claim 1 including second terminal means at one of the electrical loads in signal communication with the electrical power line conductors, said second terminal means including means for receiving the delayed interrogation signal, and means responsive to at least certain of the delayed interrogation signals for providing a response signal on the electrical power line conductors.

4. The distribution network power line carrier communication system of claim 3 including means at the first terminal for receiving the response signal.

5. The distribution network power line carrier communication system of claim 3 wherein the repeater means includes means for repeating the response signal, including means for receiving the response signal, means delaying the response signal for a predetermined time interval, means applying the delayed response signal to the electrical power lines, and means preventing the repeater means from repeating the delayed response signal, and wherein the first terminal means includes means for receiving said delayed response signal.

6. The distribution network power line carrier communication system of claim 1 wherein the interrogation signal is a serial word having a plurality of bits in a mark-space format, with the time duration of a space being at least as long as the time duration of a mark, and wherein the repeater means alternately receives and transmits the bits of the interrogation signal until the complete signal word is repeated, with the means applying the delayed interrogation signal to the electrical power lines being operative during the spaces of the interrogatioon signal.

7. The distribution network power line carrier communication system of claim 1 wherein the interrogation signal is a serial word having a plurality of bits, and wherein the repeater means receives the complete word before the means for applying the delayed interrogation signal to the electrical power lines is operated.

* * * * *